E. L. TOWNSEND.
ARTIFICIAL TOOTH.
APPLICATION FILED JUNE 14, 1909.

952,155.  Patented Mar. 15, 1910.

Witnesses,
J. E. Monteverde
Mamie E. Ruhe.

Inventor,
Emory L. Townsend
By Carpham
Attorney.

UNITED STATES PATENT OFFICE.

EMORY L. TOWNSEND, OF LOS ANGELES, CALIFORNIA.

ARTIFICIAL TOOTH.

952,155.  Specification of Letters Patent.  Patented Mar. 15, 1910.

Application filed June 14, 1909. Serial No. 501,904.

*To all whom it may concern:*

Be it known that I, EMORY L. TOWNSEND, a citizen of the United States, residing at the city of Los Angeles, county of Los Angeles, State of California, have invented new and useful Improvements in Artificial Teeth, of which the following is a specification.

Figure 1:
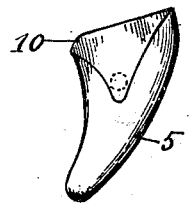
Figure 2:
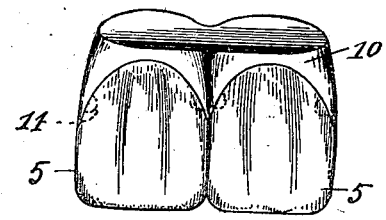
Figure 3:
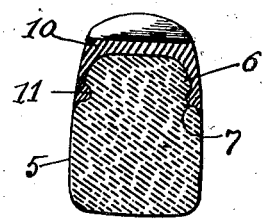
Figure 4:
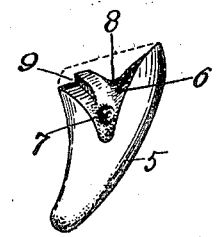

My invention relates to that class of artificial teeth which are principally used in bridge work and crown work; and the object thereof is to provide a simple and inexpensive tooth which will possess great strength and which can be mounted in bridge work with a minimum amount of labor. I accomplish this object by the tooth described herein and illustrated in the accompanying drawings in which, Figure 1 is an edge or end view of Fig. 2. Fig. 2 shows two of my improved teeth arranged for a bridge, the metal base or socket being cast thereon. Fig. 3 is a longitudinal, central, vertical section of a single tooth having its metal base or socket cast thereon. Fig. 4 is an edge elevation of one of my improved teeth with the cast metal base or socket omitted.

My improved tooth is composed of the porcelain body 5 which is provided on each side with vertical grooves 6 which are preferably V-shaped and extend from the base of the tooth toward the outer end. I prefer to have these grooves extend about one half the length of the tooth. In the body of the tooth preferably near the outer ends of these grooves and opening into the same are recesses or depressions 7 which are preferably semi-globular. These depressions are part of the grooves and form the deeper portions of the grooves. They may be located in any part of the groove above the root end, but are preferably at the outer end. In the base I provide a transverse groove 8 which opens into the side grooves.

The inner edge of the base of the tooth is preferably provided with a rabbet 9. This rabbet may be omitted, but I prefer its use as thereby the metal base or socket 10 is thicker and stronger than it would be if the rabbet were omitted.

In using my tooth for bridge work the teeth for the bridge are secured in a mold which is formed to cast the metal base or socket portion of the bridge upon the base of the teeth. When the metal is poured into the mold it enters the grooves in the teeth and into the recesses opening out of such grooves and when the liquid metal solidifies the teeth are firmly held together. The metal in the grooves hold the teeth from any transverse movement and the small knobs 11 which fill the depressions 7 hold the body from separating from the metal. Any other form of depression will be equally effective, it being only necessary that at some point above the base the grooves shall approach each other.

I am aware that artificial teeth have been made in which side grooves have been provided, but such side grooves were so arranged that the tooth would slip on and off ribs provided in the socket cup, and the socket and tooth were secured together by cement. I therefore, do not broadly claim a tooth with grooves in the sides thereof, as my invention consists in grooves in the sides of the body with some portions thereof closer than at the base.

Having described my invention what I claim is;

1. An artificial tooth comprising a porcelain body member having side grooves opening through its root end, said grooves being deeper at some point above the root end than at the root end.

2. An artificial tooth comprising a body member having grooves in the sides and opening through the root end thereof, said grooves at some point above the root end being deeper than at the root end, in combination with a cast metal base or socket cast upon the tooth.

In witness that I claim the foregoing I have hereunto subscribed my name this 7th day of June, 1909.

EMORY L. TOWNSEND.

Witnesses:
G. E. HARPHAM,
S. B. AUSTIN.